Figure 4:
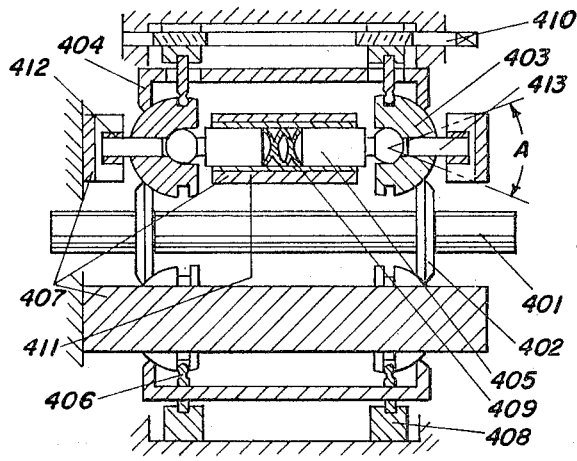

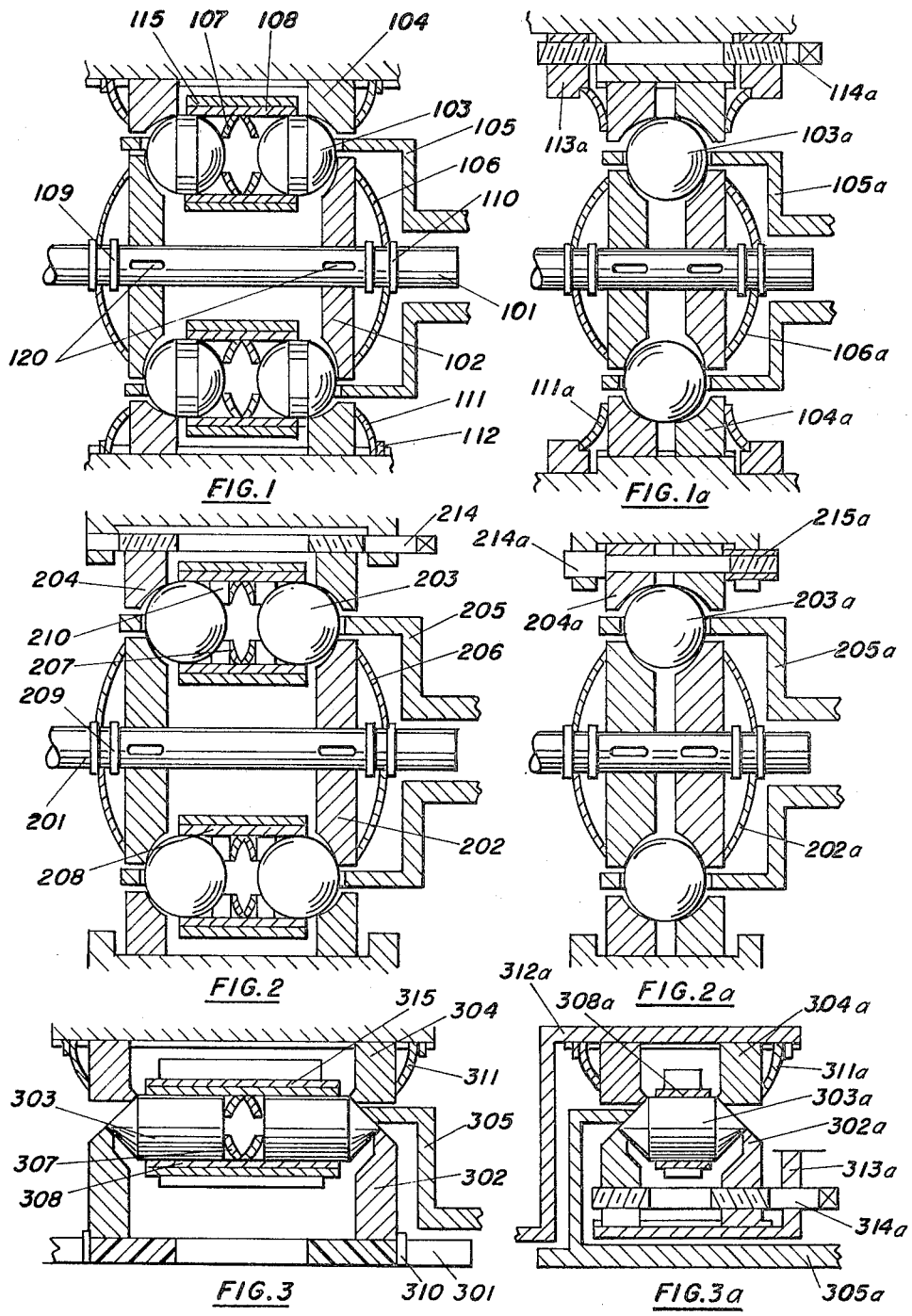

Dec. 27, 1966 W. V. CHERY 3,293,947
TORQUE CONVERTER AND VARIABLE DRIVE
Filed July 27, 1964 4 Sheets-Sheet 3
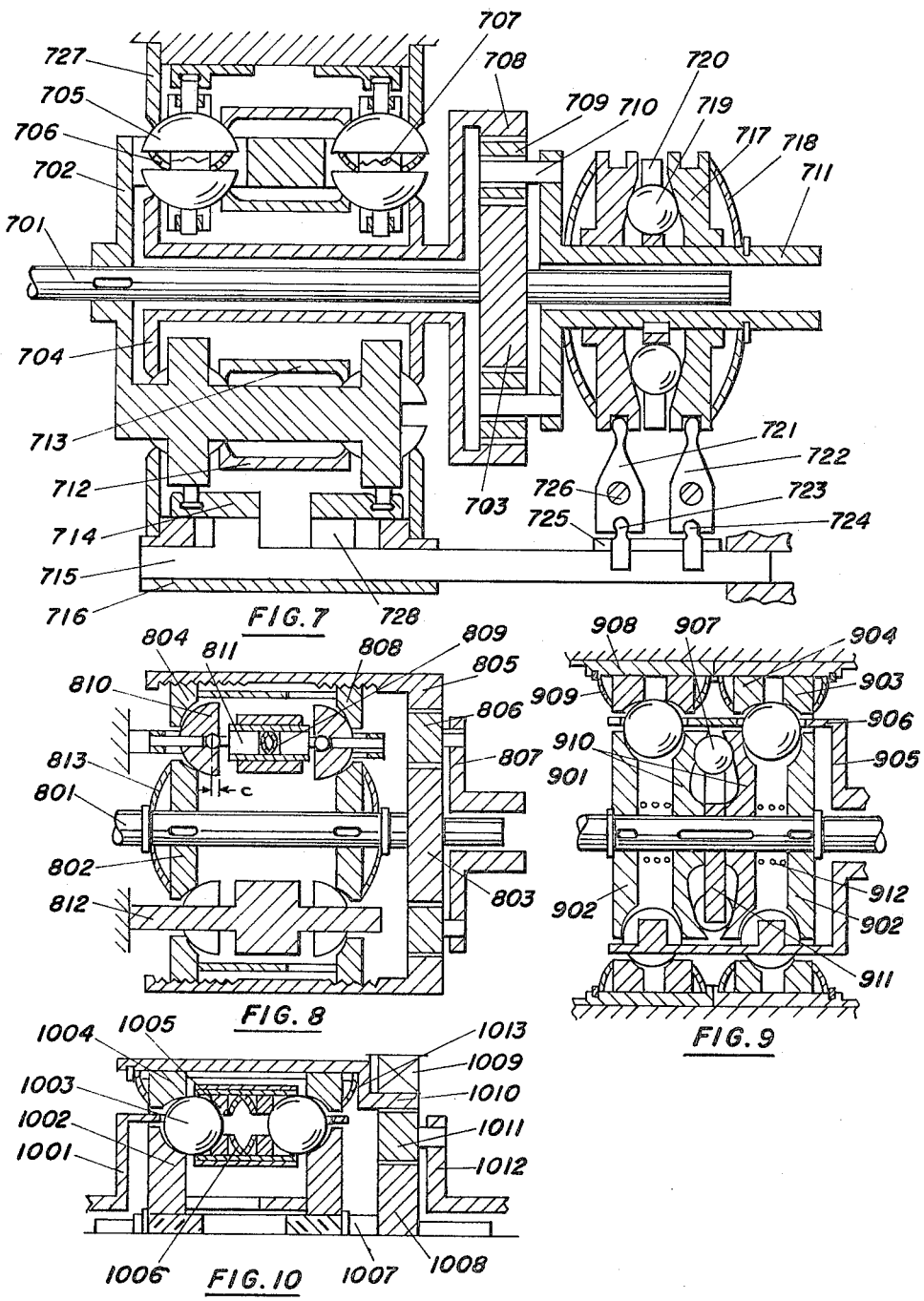
INVENTOR.
WALTER V. CHERY
BY Charles L. Lovercheck
attorney Dec. 27, 1966   W. V. CHERY   3,293,947
TORQUE CONVERTER AND VARIABLE DRIVE
Filed July 27, 1964                             4 Sheets-Sheet 4

POSITION 1                POSITION 2

INVENTOR.
WALTER V. CHERY
BY
Charles L. Lovercheck
attorney

United States Patent Office 3,293,947
Patented Dec. 27, 1966

3,293,947
TORQUE CONVERTER AND VARIABLE DRIVE
Walter Valdemar Chery, 908 Fairview Ave.,
Meadville, Pa. 16335
Filed July 27, 1964, Ser. No. 385,329
23 Claims. (Cl. 74—796)

This application is a continuation in part of application, Serial No. 837,856, filed Sept. 3, 1959, now Patent No. 3,224,300.

This invention relates to transmissions, and, more particularly, to variable drive and torque converter type of transmissions.

This application constitutes an improvement over the said application in that a wider speed range, capacity, and an improvement in that commercial type rolling elements are used instead of rollers.

The above is accomplished by using individual symmetrically preloaded rolling elements on planetary elements as explained hereinafter.

It is, accordingly, an object of the invention to provide an improved variable drive and torque converter.

Another object of the invention is to provide a torque converter which is simple in construction, economical to manufacture, and simple and efficient to use.

Another object of the invention is to provide an improved torque converter.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 11:
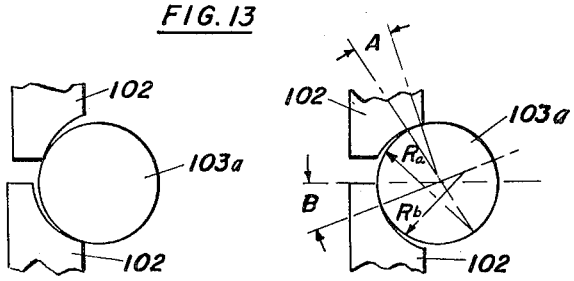
Figure 12:
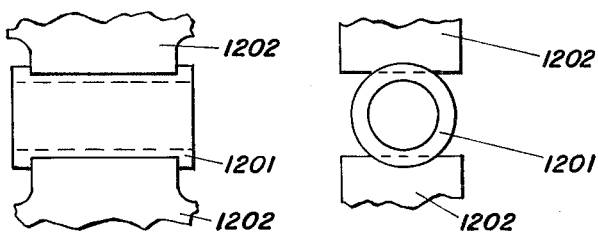

In the drawings:

FIGS. 1 through 13 each show different embodiments of the invention;

FIGS. 11 and 12 show details of the ball arrangement according to the invention.

Now with more particular reference to FIG. 1, a design for a heavy duty torque converter is shown wherein commercial type balls are used, these balls being reworked to slightly modify them.

The torque converter unit is a planetary design unit wherein each ball 103 is preloaded individually by Belleville springs 107 and therefore each ball transmits the power with no danger of overloading individually. For the same reason, the manufacturing tolerance on these same balls may be more liberal because of the preloading arrangement of the spring, and consequently the manufacturing cost can be reduced.

Sun wheels 102 slide on input shaft 101 on keyway 120 or other suitable arrangement. The sun wheels 102 are preloaded by Belleville springs 106. The planetary balls 103 have a flat peripheral band portion on which they can slide in sleeve 108 and they are preloaded by the springs 107. The preload springs 107 are of the Belleville type which when under load lock themselves in the sleeve 108 and therefore prevent planetary balls 103 from rotating in relation to each other. It should be understood that the cylindrical rolls with the ball surface at the ends in contact with the sun wheels and reaction rings could be used.

Sleeves 108 rotate in bushings 115 which in turn can slide axially in the planetary cage 105 as shown in FIG. 1. The planetary balls 103 are in rolling contact with the sun wheels 102 and reactive rings 104. The reactive rings 104 are locked in the housing against rotation but can slide in and are preloaded by springs 111. The preload springs 111 and 106 are selected in such a manner that when the speed of the output planetary cage 105 is zero the sun wheels 102 are held in position against stop washers 109. The sun wheels 102 and reactive rings 104 have a greater radius of curvature in their correct areas than the planetary balls at the central points, as is shown in FIG. 11, and in this position the torque multiplication is maximum.

When the speed of the output cage 105 is gradually increased, the centrifugal forces on balls 103, sleeves 108 and bushings 115 will force the reaction rings 104 outward while sun wheels 102 urged by springs 106 will be forced inward, until output cage 105 will reach normal operating speed which is at a 1:1 ratio of input to output speed for the proportion shown. In the embodiment of the invention shown in FIG. 1a, a torque converter is shown suitable for light duty. The preload springs 106a and 111a and variation in ball diameter allow only part of the planetary balls to carry the load. Also the limited bearing area between the planetary balls and cage reduces the capacity of the unit.

This design incorporates an arrangement that when working within a range, the range can be changed and therefore a variable range torque converter is provided which can be used as a variable drive as well as a fixed speed drive. In this case, an electric motor when used with the torque converter will be protected from overload during the starting period.

The design shown in FIG. 1a is similar to FIG. 1, except that one row of planetary balls are used in the embodiment of FIG. 1a, and the preload is accomplished by springs 111a, which can be adjusted by turning screws 114a. The screw 114a is received by rings 113a and has right hand and left hand threaded portions and therefore the rings 113a can be moved inward or outward uniformly.

In the embodiment of the invention shown in FIG. 2, the arrangement for a heavy duty variable drive where commercial balls also are used for rolling elements is provided. These commercial balls will not need to be reworked in order to be useful in the combination.

The rings 210 are used between springs 207 and balls 203 to prevent the springs from digging into the balls. This design differs from FIG. 1 in that the sun wheels 202 are preloaded while the reaction rings 204 are held in position by the adjusting screws 214 similar to FIG. 1a. Therefore, the balls cannot be moved by inertia forces as in the torque converter shown in FIG. 1. By means of screw 214, the reactive rings 204 are locked against rotation but can be moved inward or outward resulting in the change of speed of the output cage 205.

In the embodiment of the invention shown in FIG. 2a, an arrangement for light duty application is shown, wherein a variable speed drive with only symmetrical preload by springs 202a and one row of planetary balls is used. Otherwise, the design of FIG. 2a is similar to FIG. 2. The adjusting screw 214a is provided with a single thread, and adjustment is made by turning the nut 215a. Both the head of the screw and the nut 215a can slide in the housing and therefore the reactive rings 204a are self-locating.

In the embodiment of the invention shown in FIG. 3, the arrangement of a torque converter which has an output in proportion to demand is provided. In this embodiment, commercial rollers are used as in the others and are provided with individual preload planetary rollers. Planetary rollers 303 are provided with a cone portion at each end and are in rolling contact with sun wheels 302 and reactive ring 304. The planetary rollers 303 are preloaded by springs 307 in the same manner as the embodiment of the invention shown in FIG. 1. The sleeves 308 and bushings 315 also serve the same purpose as the corresponding parts in FIG. 1.

Sun wheels 302 can slide on right hand and left hand threaded portions on input shaft 301 inward or outward and normally are held against stop washers 310 by preload springs 311 through reactive rings 304 and planetary rollers 303. As shown, the output speed of the cage 305 is maximum and transmitted torque is normal. When the output torque increases, the sun wheels 302 will be forced inward and planetary rollers assembly will be urged radially outward until the required torque is delivered.

The embodiment of the invention shown in FIG. 3a shows a variable drive with wide speed range for light applications. One roll of planetary rollers is used, but preload spring 311a and rings 304a serve as input in this case. The sun wheels 302a can be moved by adjusting screw 314a inward or outward on sleeve 313a. The adjusting screw 314a has a sliding strip in the opening through which it passes through the sleeve 313a. The sleeve 313a serves as reactive member. The output cage 305a receives the planetary rollers in bushings 308a.

In the embodiment of the invention shown in FIG. 4, the rolling elements are used which are made of case hardened commercial type balls and are suitable for use where high capacity drive and microspeed adjustment is required.

The sun wheels 402 are integral parts of input shaft 401 and are in rolling contact with the plurality of planetary ball type rolling elements 403, which are referred to as planetary balls herein. The planetary balls 403 at their center are pivoted on pins 405 and are preloaded by springs 409. The pins 405 can freely rotate in bushings 411 which are pressed into the planetary cage 407. Planetary cage 407 is locked in the housing, and serves as a reactive member. The planetary balls 403 and pins 405 contact each other on a spherical surface of the balls 403. The pins 413 are pressed into the planetary balls at one end while the other end is received by bushing 412, which can slide in planetary cage 407. The contact surfaces of the output ring 404 and sun wheels 402 are ground with the wheel dressed to the same radius as the planetary rollers and therefore can receive high pressure at the rolling contacts without distorting the balls. The planetary balls can be positioned by rings 406 which fit into the groove on the balls. Rings 406 can be moved by rings 408 inward or outward but are free to rotate in them with output rings 404. Screw 410 is used to move rings 408 in the same manner as mentioned before.

Figure 4A:
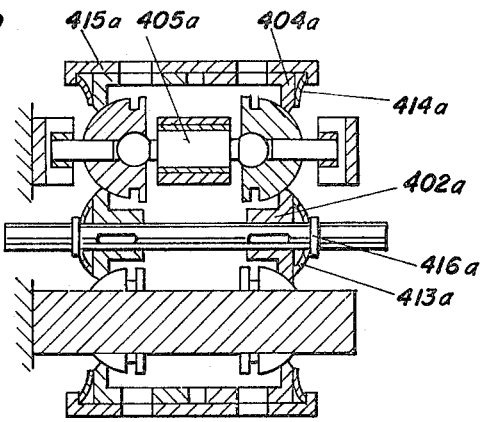

In the embodiment of the invention shown in FIG. 4a, a design for light application with symmetrical preload is used on the sun wheels 402a by springs 413a and on rings 404a by springs 414a, while rotating elements are identical to those shown in FIG. 4.

Figure 5:
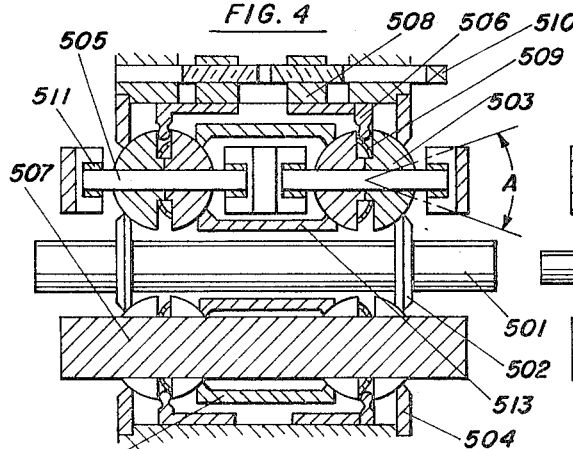

In the embodiment of the invention shown in FIG. 5, the variable drive shown has two halves of a ball used as planetary members in rolling contact with members 512, 513, 502, and 504. This design can provide a wide range of speed differential and can carry heavy loads also. The two halves of the ball 503 are used for rolling elements and are assembled in such a manner on pinions 505 that they actually comprise rolling balls. Each of two rolls of a plurality of planetary balls are in rolling contact with the sun wheels 502 and free ring 513 inside and with reactive rings 504 and free ring 512 on the outside. Because the halves of each ball are placed in preload by springs 509, the planetary balls 503 can slide on pin 505 and rotate with it in bushings 511. Bushings 511 are received in slots by planetary cage 507 which is the output member in this particular transmission. The rings 506 are integral with threaded member 508 and can be moved simultaneously inward or outward by turning screws 510. The planetary balls 503 in this case will rotate around their theoretical center and therefore provide a plurality of speed ratios.

Figure 5A:
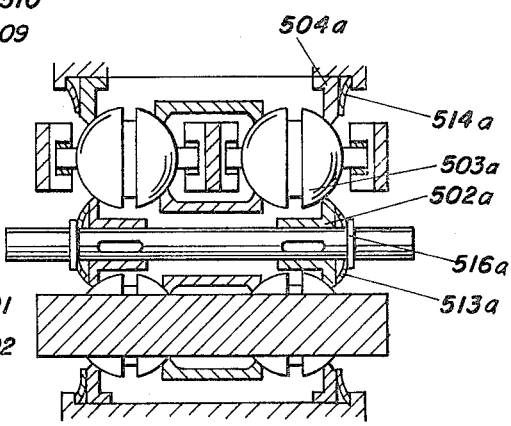

In the embodiment of the invention shown in FIG. 5a, a design for a light application is shown wherein solid balls 503a are used as planetary rolling elements and symmetrical preload by springs 513a and 514a on sun wheels 502a and reactive rings 504a is used respectively while the function of this embodiment is identical to that of the embodiment of FIG. 5.

Figure 6:
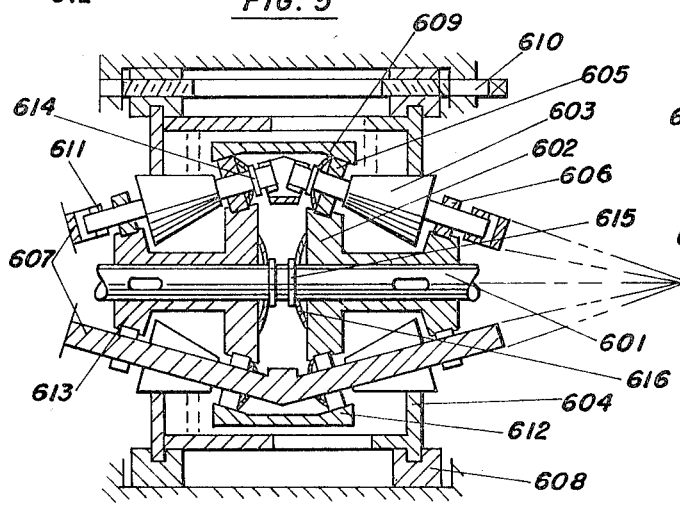

In the embodiment of the invention shown in FIG. 6, the tapered planetary rolls are used. The tapered planetary rolls 603 are in rolling contact with output rings 604. Their ends can slide in tapered rollers 605 and 606. Rollers 605 are in rolling contact with sun wheels 602 and free rotating rings 612 while roller 606 has rolling contact with sun wheel 602 only. Between the stop washer 614, which is on the end of tapered roller 603, and roller 605 are placed preload springs 609. The springs 609 pull tapered rollers 603 against output rings 604 and push tapered rollers 605 against sun wheels 602 and free ring 612, providing the individual preload on the rolling elements. The tapered rollers 605 and 606, sun wheels 602, and free rings 612 have the same apex at rolling contacts. Sun wheels 602 also are preloaded by springs 616, which prevents the sun wheels from sliding inward when output rings 604 are moved inward also. The sun wheels 602 are keyed to input shaft 601 but can slide along it. The planetary cage 607 is a reactive member in this case. Moving the rings 604 inward and outward is accomplished in the manner mentioned before by means of screws 610 and rings 608 in which the output ring 604 is free to rotate.

Figure 6A:
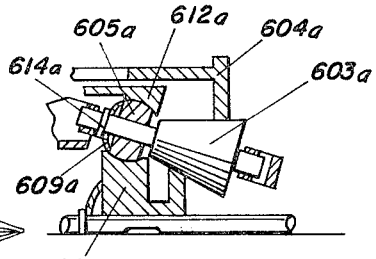

In the embodiment of the invention shown in FIG. 6a, an arrangement is shown wherein only one roller 605a is provided for each element. The roller contacts the sun wheel 602a and free ring 612a is used while tapered roller 603a is in rolling contact with the sun wheel 602a and ring 604a. Otherwise, the arrangement is similar to FIG. 6. It should be understood that one or two rows of planetary rolls can be used in this design. Where the sun wheel 602a is input member, ring 612a is the reactive member and the speed of the output ring 604a can be changed from zero to maximum in both the forward and the reverse directions.

In the embodiment of the invention shown in FIG. 7, the transmission is suitable for a vehicle. The elements make rolling contact as shown in FIGS. 5 and 5a and are adapted to provide a torque converter. This design provides forward and reverse speeds depending upon position of the planetary balls 705. In the forward direction the speed varies from zero to overdrive and this makes possible the use of lower horsepower engines for starting.

The split torque design is adapted in this planetary unit. The power flows through the input shaft 701 into the planetary cage 702 and into the sun gear 703. The planetary balls 705 are in rolling contact with sun wheels 704 and reactive rings 727 and therefore converted power flows into ring gear 708. Rings 712 and 713 are free rotating rings in this case.

The planetary cage 711, the output in this unit through planetary gears 709 and pin 710 will receive differential speed and torque. The position of planetary balls is controlled by output speed of the planetary cage 711 by centrifugal forces of the planetary balls 719 carried in planetary cage 720. The spring 718 will place shifting rings 717 in position close to zero speed when the output speed of cage 711 is zero. When the speed of output cage 711 increases centrifugal forces of the balls 719 will move rings 717 outward by applying a pressure on their tapered portion. Rings 717 receive levers 721 and 722 in their grooves. The levers 721 and 722 are pivoted on shafts 726 which are secured in the housing. Shifting plates 723 and 724 are constantly engaged with the levers 721 and 722 and can slide in their round shaped grooves engaging and disengaging shifting arms 715 and 728. This places the unit into forward or reverse operation through rings 714. Each half of the planetary balls has a cam portion 707 through which they are engaged with each other. When the output load is increased, it provides additional preload on the rolling elements beside the springs 706.

In the embodiment of the invention shown in FIG. 8, a transmission is shown wherein a combination of rolling elements from FIGS. 1 and 4 with planetary gears is used. The planetary rolling elements 810 of a type shown in FIG. 4 with offset centers "C" of the balls 810 and spherical portion of the pin 811 is used. The sun wheels 802 and outer rings 804 and 808 of the type shown in FIG. 1 are used. The preload is accomplished by individual preload springs 809 and springs 813. Rings 804 and 808 have right hand and left hand threads respectively, and are received in the rings 805 and normally held in that outward position by springs 813. The planetary cage 812 is ground. The input shaft 801 is connected to the sun wheels 802 and the sun gears 803 while outer rings 804 and 808 through threaded portions are connected to the outer gear 805 of the planetary unit. The helical angle of a thread is selected in such a manner that rings 804 and 808 can be moved outward by axial load from springs 813. The rings 804 and 808 are interlocked with each other against the relative rotation but can slide in relation to each other inward and outward. Through planetary gears 806 output planetary cage 807 receives differential speed ranging from zero into overdrive, depending on the load. When the load is increased, rings 804 and 808 will be forced by ring gear 805 to inward position to provide greater torque. A provision can be made to move the rings 804 and 808 enough inward that the unit will provide the reverse speed also.

FIG. 9 shows a transmission suitable for use on a vehicle where two torque converters as shown in FIG. 1a are connected in parallel and provision is made to engage or disengage the unit by centrifugal force. At idling, the springs 912 hold the sun wheels 910 inward overcoming centrifugal force developed by balls 907 and therefore there is no preload force on planetary balls 906. Sun wheels 910 and cage 911 are keyed to input shaft 901 but can slide along it. When the speed of the input shaft 901 increases, the balls 907 carried in cage 911 will overcome springs 912 and engage the sun wheels 910 with planetary balls 906 and therefore set the unit in operation. Otherwise the operation is identical to FIG. 1 and FIG. 1a for a torque converter.

FIG. 10 shows a transmission wherein rolling elements are active only during the torque conversion period while at 1:1 ratio and have no relative movement with each other, and therefore the whole assembly rotates at one common unit.

The input power flows through the planetary cage 1001, then through the planetary balls 1003, splits between the sun wheels 1002 and outer rings 1004, which are keyed to the outer gear 1010, can slide in it and are preloaded by springs 1013. Sun wheels 1002 are received at their threaded portions, right hand and left hand respectively, by shaft 1007 which is keyed to sun gear 1008. When the sun wheels 1002 are in outward position as shown, the torque between the sun wheels 1002 and outer rings 1004 is split in such a manner that load carried by the sun gear 1008 and ring gear 1010 at the contact points with planetary gears 1011 is equalled and therefore the assembly rotates as a common part, providing a 1:1 ratio. When the torque of the output planetary cage 1012 is increased, the sun wheels 1002 on their threaded portions will move inward providing greater torque on sun gear 1008, while the gear ring 1010 will be locked in over-running clutch 1009 and torque multiplication will occur.

Figure 13:
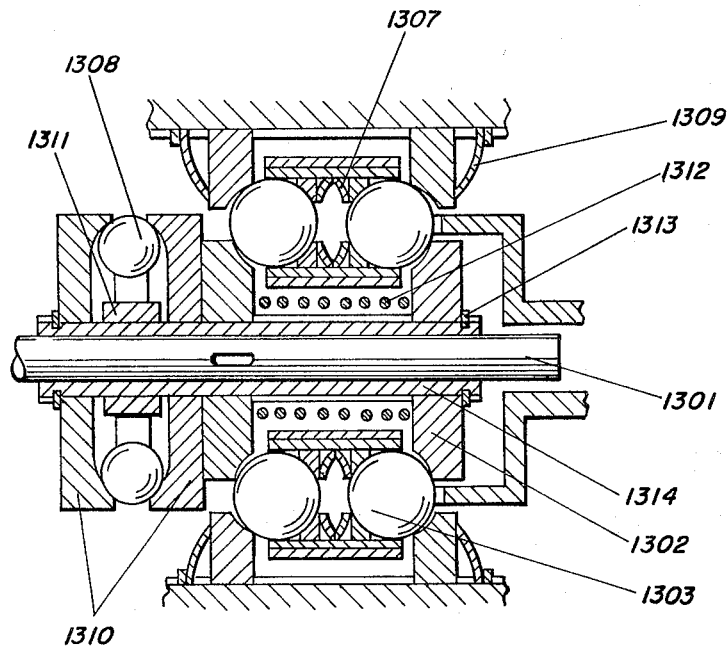

FIG. 13 shows a transmission similar to the one described in FIG 9, except individual preload on rolling elements 1303 by Belleville springs 1307 is used. Sun wheels 1302 at idling are moved apart by spring 1312 placed between them and rolling elements 1303 are not preloaded. When input speed (shaft 1301) is increased, the centrifugal forces developed by balls 1308 will move race rings 1310 apart which result in the engagement of rolling elements 1303 with sun wheels 1302 and therefore the unit will be set in operation and start to act as a torque converter.

The race rings 1310, cage 1311 which carries balls 1308, and sun wheels 1302 are all splined to the sleeve 1314 and can slide on it. The sleeve 1314 is keyed to input shaft 1301, can slide along it and carries stop washers 1313.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A transmission comprising a shaft,
spaced sun wheels slidably and non-rotatably supported on said shaft,
spaced reaction rings disposed generally concentric to said shaft and said sun wheels,
resilient means on said shaft urging said sun wheels toward each other,
resilient means urging said reaction rings toward each other,
a planetary cage disposed generally concentric to said shaft and extending between said rings and said sun wheels,
said ring members each having an internal peripheral surface inclined radially outward and toward the other of said ring members,
each said sun wheels having an outside peripheral surface inclining radially outward and away from the other said sun wheel,
and planetary rolling elements in said planetary member engaging said inclined surfaces of said ring members and said sun members and being preloaded by a force exerted by said sun wheels and said resilient means.

2. The transmission recited in claim 1 wherein
said inclined surfaces on said rings and said sun members are in the form of a curve having a cross sectional projection in the shape of an arc of a circle having a radius greater than the radius of said ball members.

3. The transmission recited in claim 2 wherein
said resilient members urging said sun wheels together comprise Belleville springs concentrically supported on said shaft and having their concave side adjacent said sun wheels and their outer periphery engaging said sun wheels.

4. The transmission recited in claim 3 wherein
said resilient means urging said reaction means toward each other comprises,
spaced Belleville washers generally concentric to said shaft and engaging said reaction members,
and threaded means engaging said Belleville washers remote from said reaction means for controlling the force on said Belleville washers.

5. The transmission recited in claim 1 wherein
said rolling elements are generally spherical in shape.

6. The transmission recited in claim 1 wherein
said rolling elements have a portion thereof generally spherical in shape.

7. The transmission recited in claim 1 wherein
said rolling elements are tapered on one end.

8. The transmission recited in claim 1 wherein
said planetary rolling elements have spherical surfaces, said spherical surfaces are developed on a radius greater than the radius of said internal peripheral surfaces of said ring members and conform generally to a part of a sphere having a radius greater than the radius of said spherical balls, and said sun wheels and said rings are keyed to said input shaft and to said housing respectively and adapted to slide inwardly and outwardly.

9. The transmission recited in claim 1 wherein
said rolling elements comprise generally cylindrical rollers having spherical surfaces at the point where they make rolling contact with said inclined surfaces,
said inclined surfaces conform generally to a part of a sphere.

10. The transmission recited in claim 1 wherein
said planetary rolling elements comprise one row of planetary balls and preload springs which are placed between outer race rings and adjustable therewith,
and means are provided to adjust said rings toward and away from each other.

11. The transmission recited in claim 1 wherein
parallel rows of said rolling elements are provided and screw threaded means is provided for moving said resilient means engaging said ring members together.

12. The transmission recited in claim 1 wherein
said sun wheels and outer race rings have a narrow portion in contact with said planetary wheels,
and a bushing receiving said planetary wheels.

13. The transmission recited in claim 1 wherein
said rolling elements are in the form of two rows of planetary half balls with the spherical portion of said balls facing outward,
said planetary half balls at their center receiving pins,
said pins being disposed in contact with said planetary half balls,
said planetary half balls having means thereon pivotally connecting them to pins at the outward end,
said pins being pressed into said planetary balls at one end and received in a bushing at the other end,
and said bushing being slidably supported in siad planetary cage.

14. The transmission recited in claim 13 wherein
said planetary half balls are provided with means to preload them.

15. The transmission recited in claim 1 wherein
said rolling elements are in the form of half spherical members connected together.

16. The transmission recited in claim 1 wherein
two pairs of rings of said rolling elements are provided,
said rolling elements having an outside surface generally cylindrical in shape,
a bushing receiving said cylindrical part of said rolling elements,
said bushing being supported in said planetary cage,
and resilient means urging the balls in each said row from the balls in the adjacent said row.

17. The transmission recited in claim 1 wherein
said rolling elements comprise two rows of cylindrical members having tapered ends,
said tapered ends being disposed in engagement with said inclined surfaces of one said sun member and one said ring member,
and a Belleville washer between each corresponding pair of said cylindrical members.

18. The transmission recited in claim 1 wherein
said rolling members comprise hemispherical members having the outer ends thereof in engagement with said inclined surfaces on said ring members and said sun members,
and means engaging the inside of said hemispherical members urging them away from each other.

19. The transmission recited in claim 1 wherein said rolling elements are frusto-conical in shape.

20. The transmission recited in claim 19 wherein said frusto-conical rollers are disposed in two rows with their small ends disposed adjacent each other.

21. The transmission recited in claim 20 wherein said resilient means comprises a preload ring.

22. The transmission recited in claim 1 wherein two pairs of rings of said rolling elements are provided with cylindrical rolling parts,
a bushing receiving said cylindrical parts of said rolling elements,
said bushing being supported in said planetary cage and resilient means urging the rolling elements in each said row from the rolling elements in the adjacent said row.

23. A transmission comprising a shaft, spaced sun wheels slidably and non-rotatably supported on said shaft,
spaced reaction rings disposed generally concentric to said shaft and said sun wheels,
resilient means on said shaft urging said sun wheels toward each other,
resilient means urging said reaction rings toward each other,
a planetary cage disposed generally concentric to said shaft and extending between said rings and said sun wheels,
said ring members each having an internal peripheral surface inclined radially outward and toward the other of said ring members,
each said sun wheels having an outside peripheral surface inclining radially outward and away from the other said sun wheel,
and planetary rolling elements in said planetary member engaging said inclined surfaces of said ring and said sun members and a preload ring comprising resilient force exerting means whereby a force is exerted on said planetary members.

References Cited by the Examiner

UNITED STATES PATENTS

| | | | |
|---|---|---|---|
| 1,112,711 | 10/1914 | Martins | 74—796 X |
| 1,370,080 | 3/1921 | Ahond | 74—796 |
| 2,209,497 | 7/1940 | Winger et al. | 74—796 |
| 2,239,983 | 4/1941 | Bade | 74—796 |
| 2,920,505 | 1/1960 | Hine | 74—796 X |
| 2,958,234 | 11/1960 | Oehrli | 74—796 X |
| 2,973,671 | 3/1961 | Elkins | 74—796 |

FOREIGN PATENTS

| | | |
|---|---|---|
| 971,564 | 8/1950 | France. |
| 1,022,892 | 12/1952 | France. |

DAVID J. WILLIAMOWSKY, *Primary Examiner.*

L. H. GERIN, *Assistant Examiner.*